US005941672A

United States Patent [19]

Lapointe et al.

[11] Patent Number: 5,941,672

[45] Date of Patent: Aug. 24, 1999

[54] RACK RETURN ASSEMBLY

[75] Inventors: Marco Lapointe, Chrysostome; John Wood, Charlesbourg, both of Canada

[73] Assignee: Steris Corporation, Mentor, Ohio

[21] Appl. No.: 08/740,730

[22] Filed: Nov. 4, 1996

[51] Int. Cl.[6] .................. B65G 67/00

[52] U.S. Cl. .................. 414/401; 414/584; 414/217; 49/324; 49/379; 49/386; 49/460

[58] Field of Search .................. 414/217, 222, 414/267, 401, 396, 584; 49/21, 379, 386, 383, 324, 460, 50, 388, 390

[56] References Cited

U.S. PATENT DOCUMENTS

| | | | |
|---|---|---|---|
| 2,883,714 | 4/1959 | May | 49/460 |
| 3,869,052 | 3/1975 | Leahy | 414/401 |
| 3,924,709 | 12/1975 | Swanson | 414/401 X |
| 4,146,994 | 4/1979 | Williams | 49/379 X |
| 4,649,598 | 3/1987 | Kinsey et al. | 49/387 X |
| 4,662,810 | 5/1987 | Nobuhara | 414/401 X |
| 4,979,261 | 12/1990 | Lasier et al. | 49/324 X |
| 5,592,780 | 1/1997 | Checkovich | 49/386 |

FOREIGN PATENT DOCUMENTS

| | | | |
|---|---|---|---|
| 2748955 | 5/1979 | Germany | 49/324 |
| 3008272 | 9/1981 | Germany | 49/324 |

OTHER PUBLICATIONS

"AMSCO Pass–Through Assembly" Tech Data SD–249R4, May 1994 2 pp.

Mar. 3, 1995 AMSCO Blueprint "Special Pass Through Window and Rack Return".

*Primary Examiner*—Frank E. Werner
*Attorney, Agent, or Firm*—Fay, Sharpe, Beall, Fagan, Minnich & McKee, LLP

[57] ABSTRACT

Racks (20) supported on a transfer cart (38) in a decontamination area (18) are loaded with contaminated articles. The carts are wheeled to a washer (14) into which the racks of contaminated articles are placed for washing. After washing, the racks are removed from the washer in a preparation and packing or clean room (12) and unloaded. The empty racks are moved through a rack return (28) back to the decontamination area. The rack return includes a rack supporting surface (32) on which glide strips (42) are mounted for sliding the racks from the clean room to the decontamination area. Guide strips (44) guide the racks to a pair of vertically pivoted polycarbonate doors (34) which the racks push open by engaging bumpers (58). After the rack has passed through the doors, a self-closure mechanism (60) closes the doors automatically. The rack return assembly includes stops (76, 78) on both sides for aligning a rack carrying cart of any of a plurality of sizes accurately with the rack return assembly.

13 Claims, 3 Drawing Sheets

RACK RETURN ASSEMBLY

BACKGROUND OF THE INVENTION

The present invention relates to the microbial decontamination arts. It finds particular application in conjunction with the washing and sanitation of hospital equipment and will be described with particular reference thereto. However, it is to be appreciated that the present invention will find application in conjunction with the cleaning and decontamination of medical, surgical, industrial, and other equipment which is cleaned or decontaminated at a central area.

Typically, hospitals have one or more central decontamination and preparation and packaging areas. This area is typically in a dedicated clean room. One or more washers are built into the wall between the clean room and the exterior. Racks of soiled equipment are loaded into the washers through a first door on the exterior of the clean room. After the equipment has been washed, it is removed from the washer through a second door on the clean room side of the washer.

Within the clean room, the equipment is removed from the racks and prepared and packaged for reuse. Where appropriate, the items may be sterilized are wrapped in microbially impenetrable wraps as part of the preparation and packing process.

The empty racks exit the clean room through a rack return assembly. One popular prior art pass through assembly includes a vertical sliding window with a planar stainless steel countertop and shelf below it. An operator raises the window and locks it in the raised or open position. The operator then places one of the racks on the countertop below the window and slide it on to the shelf area outside the window. The operator would then release and close the window. One of the drawbacks of this prior pass-through assembly is that it required three discrete operations by the technician, i.e., opening the window, moving the rack through the window, and closing the window. Another drawback to this construction is that if the operator is not careful, the racks become skewed, striking the guides for the window. Moreover, the job of the attendant on the soiled side is more difficult when the racks were skewed or the cart for the racks is not accurately aligned with the shelf.

In another prior art pass-through, a pair of doors or windows are mounted to pivot about a vertical axis. The doors have wide metal frames surrounding small tempered glass windows. This construction suffers from many of the above-discussed drawbacks. The attendant opens the doors inward and latches them, slides the rack through and closes the doors.

The present application discloses a new and improved rack return assembly which overcomes the above-referenced drawbacks and others.

SUMMARY OF THE INVENTION

In accordance with one aspect of the present invention, a rack return assembly is provided for passing racks from a clean room where decontaminated articles are removed from the racks to a decontamination room where contaminated articles are loaded into the racks in preparation for a decontamination process. A rack-supporting surface extends from a clean room side to a decontamination room side of the rack return assembly. The door assembly is disposed contiguous to the rack supporting surface for separating the clean room and the decontamination room when in a closed position and when passing the empty racks therethrough when in an open position. A self-closing mechanism closes the door assembly automatically after a rack has been passed therethrough.

In accordance with another aspect of the present invention, a pass-through assembly is provided for passing racks from a clean room where decontaminated articles are removed from the racks to a decontamination room where contaminated articles are loaded into the racks in preparation for a decontamination process. A rack supporting surface extends from a clean room side to a decontamination room side of the pass-through assembly. A pair of vertically pivoted polycarbonate doors are disposed contiguous to the rack-supporting surface for separating the clean room and the decontamination room when in a closed position. The doors pivot outward from the clean room to pass emptied racks therethrough. A bumper strip of high-impact, low-friction, plastic is mounted a lower edge of each door such that racks pushed against the doors contact the bumper strip when pushing the doors open.

In accordance with another aspect of the present invention, a rack return assembly is provided for passing racks from a clean room where decontaminated articles are removed from the racks to a decontamination room where contaminated articles are loaded into the racks in preparation for a decontamination process. A rack supporting surface extends from a clean room side to a decontamination room side of the rack return assembly. A pair of vertically pivoted doors are disposed contiguous to the rack-supporting surface for separating the clean room and the decontamination room when in a closed position. A first set of alignment surfaces are associated with at least one end of the rack supporting surface for aligning and positioning a rack carrying cart of a first preselected size. A second set of alignment surfaces are associated with the same end of the rack supporting surface for aligning a rack carrying cart of a second size. In this manner, carts of at least two different sizes are accurately alignable with the rack-supporting surface.

In accordance with another aspect of the present invention, a rack return assembly is provided for passing racks from a clean room where decontaminated articles are removed from the racks to a decontamination room where contaminated articles are loaded into the racks in preparation for a decontamination process. A rack supporting surface extends from a clean room side to a decontamination room side of the rack return assembly. A pair of vertically pivoted doors are disposed contiguous to the rack-supporting surface for separating the clean room and the decontamination room when in a closed position. The doors are each constructed of a single unframed sheet of transparent tinted plastic and have a bumper strip along a lower edge facing towards the clean room side.

In accordance with a further aspect of the present invention, a method of passing racks which have been emptied of decontaminated articles in a clean room is provided. The racks are passed out of the clean room to a decontamination area to be reloaded with articles for a decontamination process. The method includes sliding a rack which has been emptied of decontaminated articles from a cart onto a rack supporting surface, sliding the rack along the rack supporting surface between guides toward a pair of vertically pivoted doors, pressing the rack against the vertically pivoted doors forcing the doors to open against a biasing force which biases the doors to close, continuing to push the rack onto a rack supporting surface in the decontamination area, sliding the rack from the rack supporting surface onto a rack supporting cart in the decontamination area, and allowing the doors to close under the biasing force.

One advantage of the present invention resides in its ease of operation.

Another advantage of the present invention is its durability.

Another advantage of the present invention is that the rack return is self-closing, to minimize potential contamination flow.

Another advantage of the present invention is that a single discrete operation, pushing forward the empty rack replaces three former operations.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
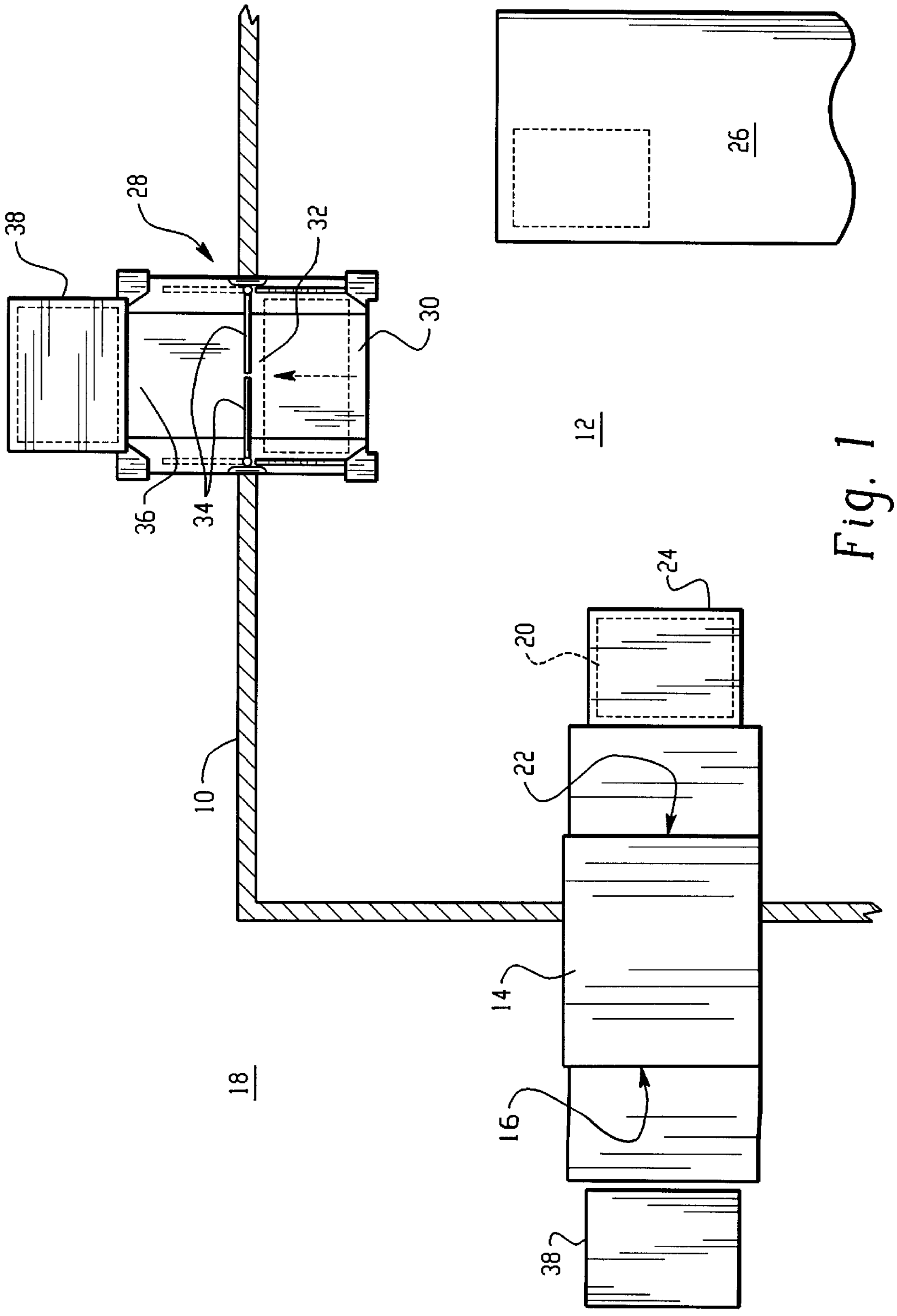
FIG. 1 is a diagrammatic illustration illustrating installation of the present invention in a clean room.

With reference to FIG. 1, walls 10 define the periphery of a preparation and packing area or clean room 12. A washer 14 extends through one of the walls. The washer has a first door or entrance 16 in a decontamination area 18. Racks 20 of items are loaded into the decontamination area door 16 of the washer 14 and the washing cycle is started. After the washing cycle, the racks 20 are unloaded from a preparation and packing area door 22 into the washer and are loaded onto a clean room cart 24. An operator rolls the cart to a work surface 26 where a preparation and packaging operation is performed. Thereafter, the cart 24 with the empty rack is rolled to a rack return assembly 28.

The empty rack is slid from the cart onto an inside portion 30 of a slide surface 32 of the rack return assembly 28. The rack is pushed through pivotal doors 34 onto a decontamination area side 36 of the support surface 32. In the decontamination area, the rack is loaded onto a decontamination area cart or rack holder 38 which is docked to the decontamination area side 36 of the rack return. The cart is rolled to a workstation in the decontamination area where the rack is loaded with items to be washed and decontaminated. The cart is then rolled to the decontamination entrance 16 to the washer 14 and the process repeated.

Figure 2:
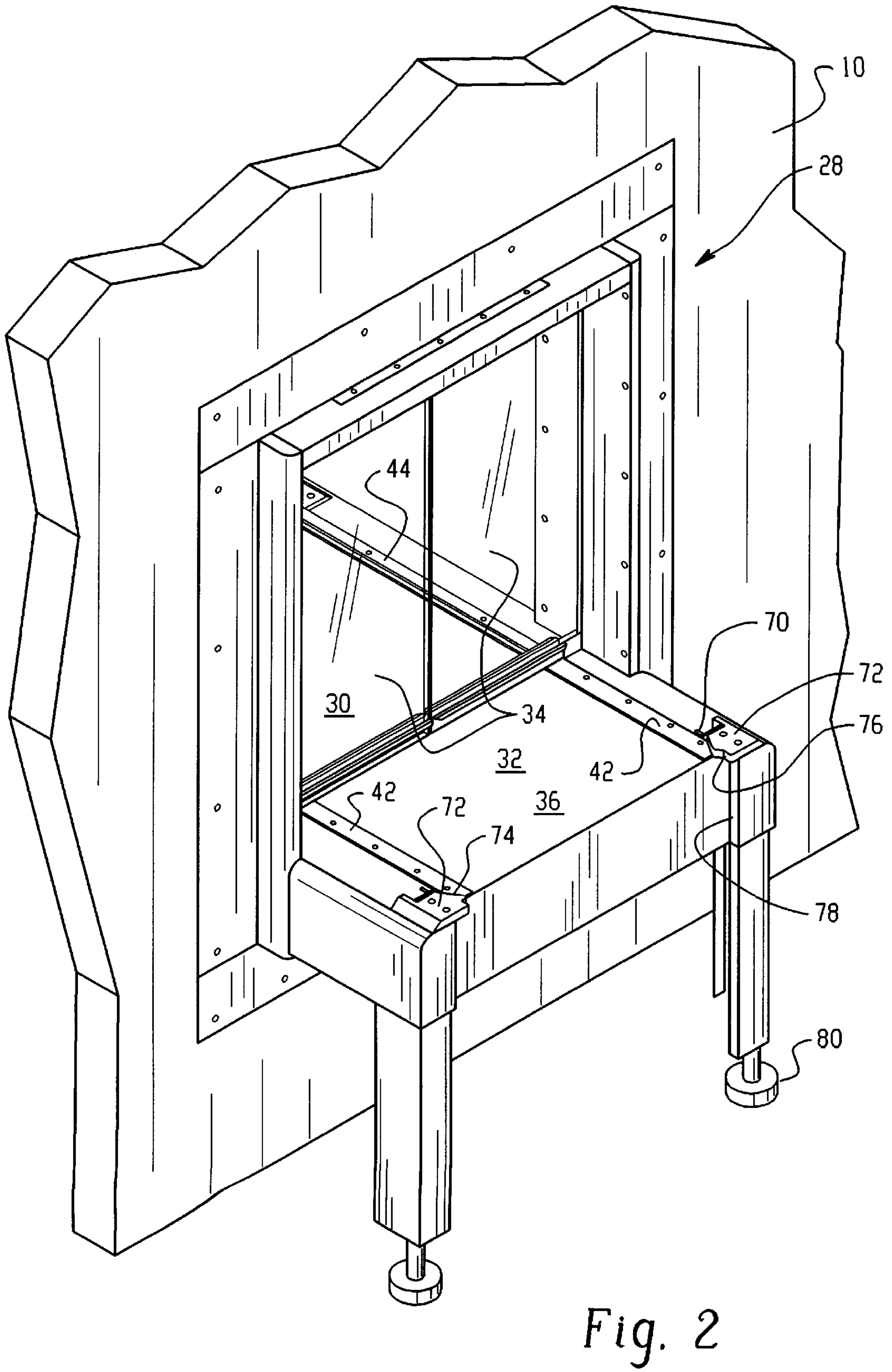
FIG. 2 is a perspective view of the present invention from the exterior of the clean room, i.e., from the decontamination area; and, FIG. 3 is a perspective view of the rack return of FIG. 2 in partial section with the doors opened.
Figure 3:
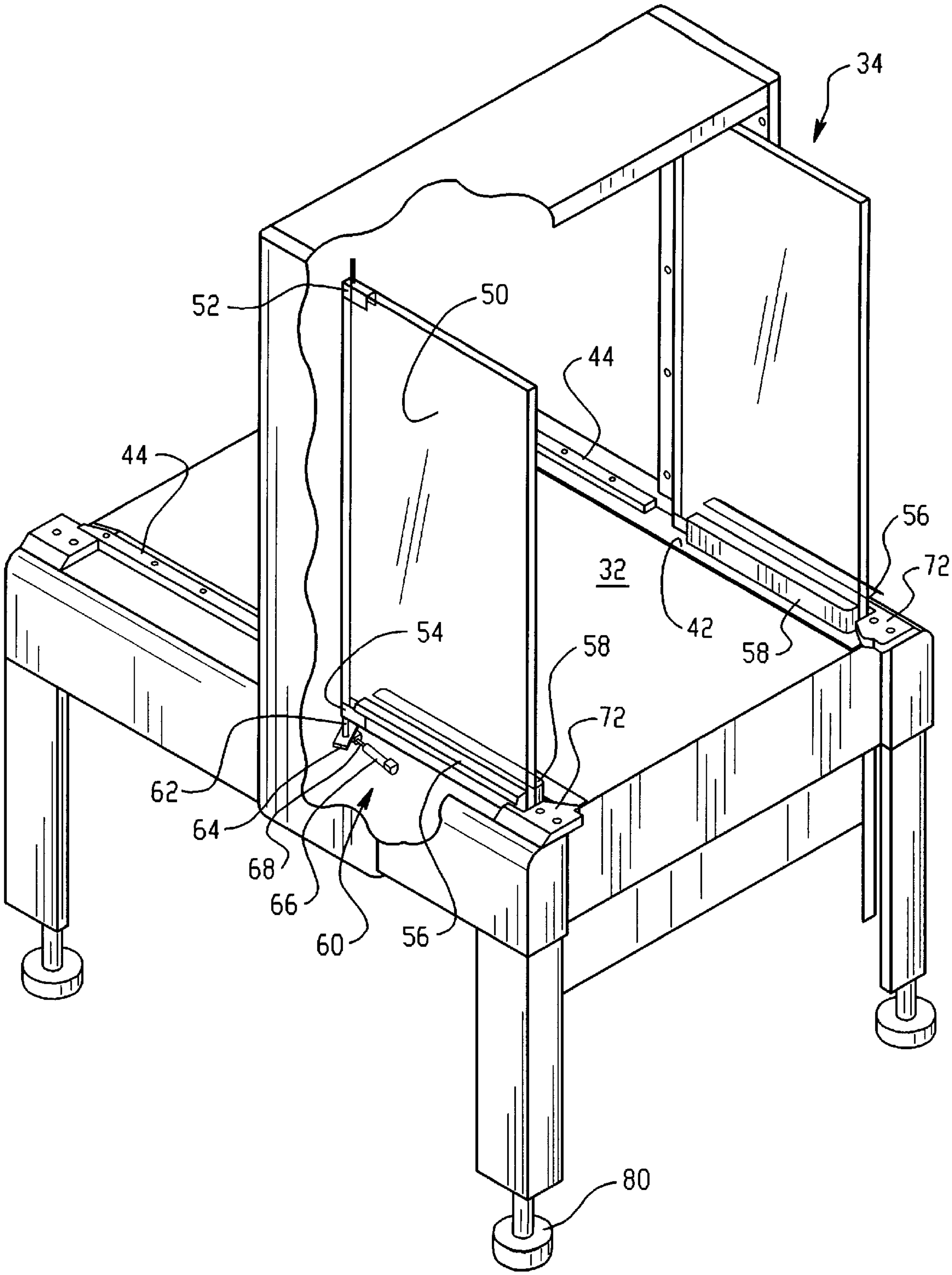

With reference to FIGS. 2 and 3, the clean room and decontamination area sides of the support surface 32 are preferably fabricated from a continuous sheet of stainless steel. One or more glide strips 42 of high-impact, low-friction, plastic material extend along the surface 32. Preferably, the glide strips 42 are disposed adjacent opposite edges to support the edges of the rack 20. Suitable high-impact, low-friction, plastic materials include UHMW™ polyethylene. A pair of guide strips 44 of the high-impact, low-friction, plastic extend along opposite edges of the glide strips 42 on the clean room side. The guide strips assure that the basket is centered and prevent the basket from becoming misaligned. The guide strips extend up to the doors 34.

The doors 34 each include a single sheet 50 of a tinted, transparent, high-impact plastic, preferably LEXAN™ polycarbonate. The doors are connected with upper and lower hinge mechanisms 52, 54. A handle assembly 56 is mounted on the decontamination room side of each door. A bumper strip 58 of the high-impact, low-friction, plastic material extends along the lower edge of each door.

Each of the doors 34 is connected with an automatic closure assembly 60. More specifically to the preferred embodiment, the lower hinge 54 includes a hinge pin 62 which is received in and extends through a bushing surface (not shown). The hinge pin is connected with a lever arm 64 which, in turn, is connected with a gas cylinder 66. As the door is pushed open, a piston rod 68 of the gas cylinder compresses the gas within the cylinder. After the tray is moved past the doors, the gas within the cylinder expands, pushing the rod out and closing the doors. Of course, other automatic closure mechanisms are also contemplated.

A pair of door locks 70 are provided for selectively locking the doors in the open position, when desired. When the doors are fully opened, either held open by the door locks or from the pressure of a rack passing therebetween, the doors extend substantially to decontamination area end guides 72. The guides each include a tapered surface 74 for centering the trays. A pair of notches 76 receive mating edges of the cart 38. In this manner, the cart is held accurately in position and the racks are guided accurately onto the cart. The rack return assembly further includes surfaces 78 for positioning a larger, lower cart.

More specifically to the preferred embodiment, the guides surfaces 76 are designed to position a narrower, higher cart; whereas, the guide surfaces 78 are dimensioned to position a wider, shorter cart. Height adjustable feet 80 enable the rack return assembly to be mounted at a height corresponding to the carts with which it is to be used. Analogous cart aligning surfaces are defined on the clean room side as well.

The invention has been described with reference to the preferred embodiment. obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A rack return assembly for passing racks from a clean room where decontaminated articles are removed from the racks to a decontamination area where contaminated articles are loaded into the racks in preparation for a decontamination process, the rack return assembly comprising:

- a horizontal rack supporting surface having a first side adapted to extend into the clean room and a second side adapted to extend into the decontamination area;
- a pair of doors, each door being constructed of a single sheet of see-through plastic and mounted to pivot about a vertical axis, the pair of doors being disposed between the first side and the second side of the rack supporting surface when in a closed position and for passing empty racks therethrough when in an open position;
- a self-closing mechanism for biasing the door assembly to return to the closed position automatically after a rack has passed therethrough; and
- latching mechanisms for locking the doors in the open position against a biasing force of the self-closing mechanism.

2. The rack return assembly as set forth in claim 1 further including a pair of high-impact glide strips passing below the doors across the first and second sides of the rack supporting surface.

3. The rack return assembly as set forth in claim 1 further including alignment surfaces associated with at least one side of the rack supporting surfaces for aligning and positioning a cart of a first preselected size thereto.

4. The rack return assembly as set forth in claim 1 further including a bumper strip of high-impact, low-friction, plastic mounted along a lower edge of each door such that racks pushed against the doors contact the bumper strip to push the doors open, whereby the bumper strips absorb abuse associated with opening the doors with the racks.

5. The rack return assembly as set forth in claim 1 further including a pair of high-impact, low-friction, guide strips mounted along side edges of the rack supporting surface from the first end to the pair of doors for guiding the racks along the rack supporting surface and squarely into the doors.

6. The rack return assembly as set forth in claim 1 further including a pair of low-friction glide strips passing along the rack supporting surface across the first side, below the doors and across the second side to facilitate sliding the racks easily onto the first side, across the first side, through the doors, across the second side, and off the second side.

7. A rack return assembly for passing racks from a clean room where decontaminated articles are removed from the racks to a decontamination area where contaminated articles are loaded into the racks in preparation for a decontamination process, the rack return assembly comprising:

a rack supporting countertop having a clean side for extending into the clean room and a contaminated side for extending into the decontamination area;

a pair of vertically pivoted doors which pivot about vertical axes between a closed position in which the doors lie along a common plane and an open position in which the doors lie along parallel planes, each door being constructed of a single sheet of polycarbonate plastic, the doors being disposed contiguous to the rack supporting countertop for separating the clean and contaminated sides when in the closed position and pivoting outward toward the contaminated side to pass emptied racks from the clean side to the contaminated side;

a self closing mechanism for biasing the doors to the closed position with a biasing force; and, a bumper strip of high-impact, low-friction, plastic mounted alone a lower edge of each door such that racks impact the bumper strips when pushed against the doors to move the doors against biasing force of the self-closing mechanism from the closed position to the open position.

8. A rack return assembly for passing racks from a clean room where decontaminated articles are removed from the racks to a decontamination area where contaminated articles are loaded into the racks in preparation for a decontamination process, the rack return assembly comprising:

a rack supporting countertop extending from a clean side to a contaminated side;

a pair of vertically pivoted doors mounted by pivots contiguous to the rack supporting countertop which pivot between a closed position separating the clean and contaminated sides of the rack supporting surface and an open position pivoted outward to the contaminated side, each door being constructed of an unframed sheet of see-through plastic to which the pivots are directly mounted;

a self-closing mechanism which applies a biasing force that urges the doors to pivot from the open position back to the closed position;

a bumper strip of high-impact, low-friction, plastic mounted along a lower edge of each door facing toward the clean side such that racks pushed against the doors contact the bumper strip to push the doors open, whereby the bumper strips absorb abuse associated with opening the doors with the racks.

9. The rack return assembly as set forth in claim 8 further including a pair of high-impact, low-friction, guide strips mounted on the clean side along opposite edges of the rack supporting countertop to engage sides of the racks for guiding the racks along the rack supporting countertop.

10. The rack return assembly as set forth in claim 9 further including a glide strip disposed adjacent the guide strip on the clean side, under the doors, and across the contaminated side of the rack supporting countertop for supporting a lower surface of received racks thereon, the glide strip being constructed of a low-friction material such that the racks received thereon slide on the low-friction material.

11. A rack return assembly for passing racks from a clean room where decontaminated articles are removed from the racks to a decontamination area where contaminated articles are loaded into the racks in preparation for a decontamination process, the rack return assembly comprising:

a rack supporting surface having a first side adapted to extend into the clean room and a second side adapted to extend into to the decontamination area;

a pair of doors mounted to pivot about a vertical axis, disposed contiguous to the rack supporting surface for separating the first side of the rack supporting surface from the second side in a closed position, and for passing racks therethrough in an open position;

a self-closing mechanism for closing the doors automatically after the rack has been passed therethrough;

a plurality of low-friction glide strips passing below the doors and across the first and second sides of the rack supporting surface to provide a low-friction sliding surface for the racks; and a pair of guide strips disposed adjacent the glide strips on the first side of the rack supporting surface to guide the racks along the first side into the doors.

12. A rack return assembly for passing racks from a clean room where decontaminated articles are removed from the racks to a decontamination area where contaminated articles are loaded into the racks in preparation for a decontamination process, the rack return assembly comprising:

a rack supporting surface along which racks are slid from a clean side to a contamination side;

a pair of vertically pivoted doors disposed contiguous to the rack supporting surface for separating the clean and contamination sides in a closed position and for passing the racks therethrough in an open position;

a first set of alignment surfaces associated with at least one end of the rack supporting surface for aligning and positioning a rack carrying cart of a first preselected size thereto to dock the first size rack carrying cart to the at least one end to facilitate moving the racks between the rack supporting surface and the first size rack carrying cart; and, a second set of alignment surfaces associated with the at least one end of the rack supporting surface for aligning a rack carrying cart of a second preselected size therewith to dock the second size rack carrying cart at the at least one end to facilitate moving the racks between the rack supporting surface and the second size rack carrying cart, such that carts of at least two different sizes are accurately alignable with the rack supporting surface.

13. A rack return assembly for passing racks from a clean room where decontaminated articles are removed from the racks to a decontamination area where contaminated articles are loaded into the racks in preparation for a decontamination process, the rack return assembly comprising:

a rack supporting surface extends from a first end that is adapted to extend into the clean room to a second end that is adapted to extend into the decontamination area;

a door assembly disposed contiguous to the rack supporting surface for blocking contaminants from passing from the second end to the first end when in a closed position and for passing racks along the rack supporting surface from the first end to the second end when in an open position;

a self-closing mechanism for closing the door assembly automatically after a rack has been passed therethrough;

a pair of end guides mounted at the second end of the rack supporting surface, the end guides (i) defining cart alignment surfaces which engage and receive a rack carrying cart in an alignment with the second end which enables racks to slide from the rack supporting surface onto the cart and (ii) have facing surfaces for realigning the racks as the racks pass from the door assembly to the second end of the rack supporting surface to the cart such that the racks are aligned with the cart.

* * * * *